United States Patent [19]

Nicholas

[11] Patent Number: 4,677,481
[45] Date of Patent: Jun. 30, 1987

[54] DUAL DISPLAY MONITOR

[75] Inventor: Dan H. Nicholas, Beaverton, Oreg.

[73] Assignee: Tektronix, Inc., Beaverton, Oreg.

[21] Appl. No.: 840,101

[22] Filed: Mar. 17, 1986

[51] Int. Cl.$^4$ .................. H04N 5/00; H04N 13/00
[52] U.S. Cl. .................................... 358/139; 324/88;
   358/88; 358/92
[58] Field of Search ............... 358/139, 88, 92, 10,
   358/3; 324/77 R, 88; 340/705, 720, 721, 722,
   734

[56] References Cited

U.S. PATENT DOCUMENTS

| | | | |
|---|---|---|---|
| 3,074,014 | 1/1963 | Ross | 324/88 |
| 3,525,087 | 8/1970 | Herriott | 358/88 |
| 3,818,474 | 6/1974 | Kurner | 340/734 |
| 3,872,461 | 3/1975 | Jarosik | 340/721 |
| 3,876,936 | 4/1975 | Lester | 324/88 |
| 4,222,048 | 9/1980 | Johnson | 340/722 |
| 4,577,188 | 3/1986 | Inami | 340/721 |

Primary Examiner—Howard W. Britton
Attorney, Agent, or Firm—Francis I. Gray

[57] ABSTRACT

A waveform monitor for television has dual video channels displayed simultaneously side-by-side. The two channels are synchronized with each other or with an external sync signal and are input to a multiplexer prior to the display. A microprocessor controls the switching of the multiplexer according to the selection made by an operator. The first channel is displayed during the first half of the horizontal display sweep, and the second channel is displayed during the second half, the horizontal sweep encompassing two horizontal lines of video.

4 Claims, 4 Drawing Figures

DUAL DISPLAY MONITOR

BACKGROUND OF THE INVENTION

The present invention relates to waveform display monitors, and more particularly to a television waveform monitor for displaying two signal channels side-by-side on a single display.

Previous waveform monitors allowed two waveforms to be input to a single monitor. However, only one waveform could be displayed at a time, depending upon the setting of a switch on the front of the monitor. The selected waveform could be displayed either once or twice horizontally on the monitor display. This presents a difficulty when it is desired to compare the two waveforms to each other as the operator would have to continuously manually select between the waveforms using the front panel switch. With a dual trace display cathode ray tube (CRT) the two waveforms may be displayed vertically, one above the other, and by adjusting the vertical one may be superimposed over the other. This, however, tends to obscure the details of the two waveforms and is considerably more expensive. Therefore, what is desired is the ability to display the waveforms side by side horizontally so that both waveforms can be observed simultaneously without resorting to more expensive CRTs.

SUMMARY OF THE INVENTION

Accordingly, the present invention provides a waveform monitor having dual channels which are displayed horizontally side-by-side simultaneously. Two video channels, which are synchronized with each other or an external sync, are input into a multiplexer prior to display. A microprocessor controls the multiplexer according to the selection made by the operator on the front panel of the monitor. The horizontal sweep of the display is two horizontal lines of video data in length, and when both channels are selected for display the multiplexer is switched by the microprocessor at the horizontal line rate of the video signal. The result is that the first video channel is displayed during the first half of the display horizontal sweep, and the second video channel is displayed during the second half.

The objects, advantages and novel features of the present invention will be apparent when the following detailed description is read in conjunction with the appended claims and attached drawing.

DESCRIPTION OF THE PREFERRED EMBODIMENT

Figure 1:
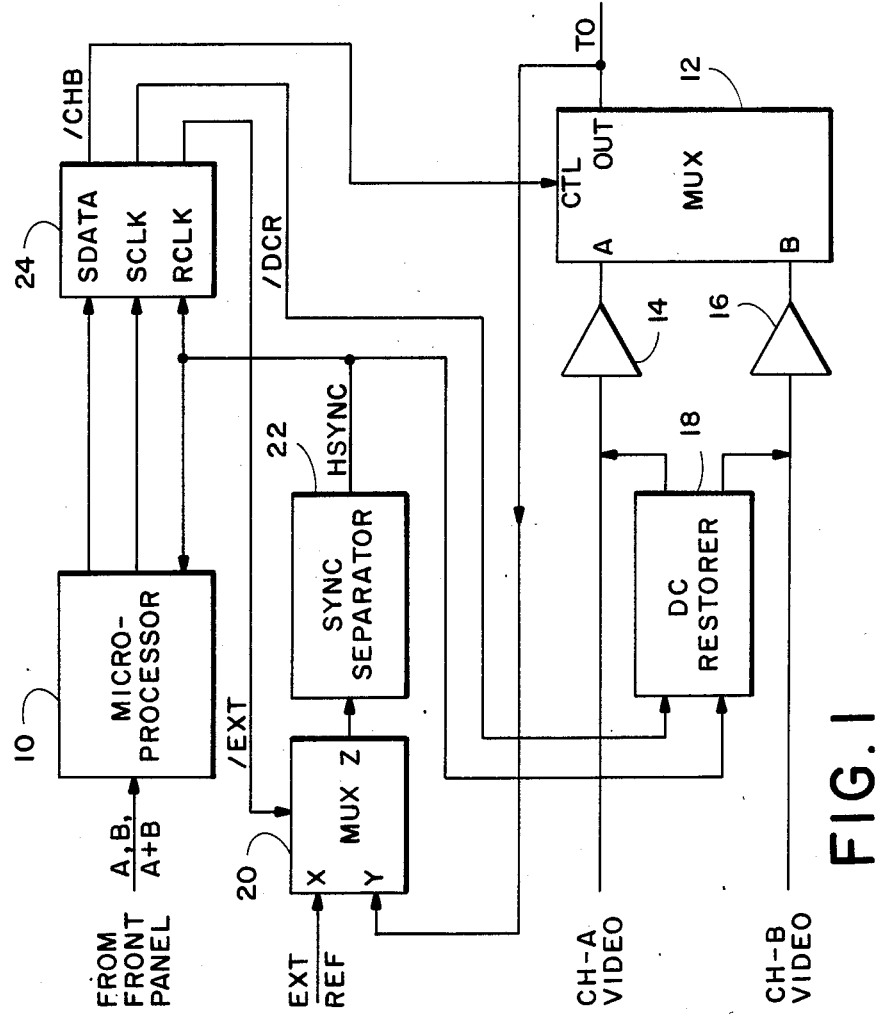
FIG. 1 is a block diagram of a dual channel display according to the present invention.

Referring to FIG. 1 a selection is made by an operator at the front panel of a waveform monitor whether to display channel A video, channel B video or both simultaneously. The display mode selected is input into a microprocessor 10. The channel A and channel B composite video signals are input to a multiplexer 12 via respective standard amplifier circuits, 14 and 16. The video signals may be subjected to dc restoration by a dc restore circuit 18 as commanded from the microprocessor 10 via latch 24. A second multiplexer 20 has as its inputs an external composite video signal to which the A and B channels are synchronized or the selected A or B channel composite video. Under control of the microprocessor 10 the multiplexer 20 passes either the external or selected composite video to a standard sync separation circuit 22 from which the horizontal sync pulses HSYNC are extracted. HSYNC is used by the microprocessor 10 to control the loading of commands into a latch 24. For each HSYNC pulse received the microprocessor 10 inputs to the latch 24 the commands to be executed when the next HSYNC pulse is received. The commands are clocked in at the serial data port SDATA by the microprocessor system clock SCLK which is fast enough to assure that the latch 24 is loaded between HSYNC pulses. Upon the receipt of the next HSYNC pulse, that HSYNC pulse is applied to the RCLK input of the latch 24 to transfer the commands loaded at the input to the output for execution during that HSYNC interval.

One of the commands output from the latch 24 is a channel select command /CHB which controls the multiplexer 12. The channel selected by /CHB is passed through the multiplexer 12 to the display circuitry of the waveform monitor in the usual manner as is well known in the art. Other commands from the latch 24 are used to select the sync source /EXT and to select dc restore /DCR for the video channels.

Figure 3:
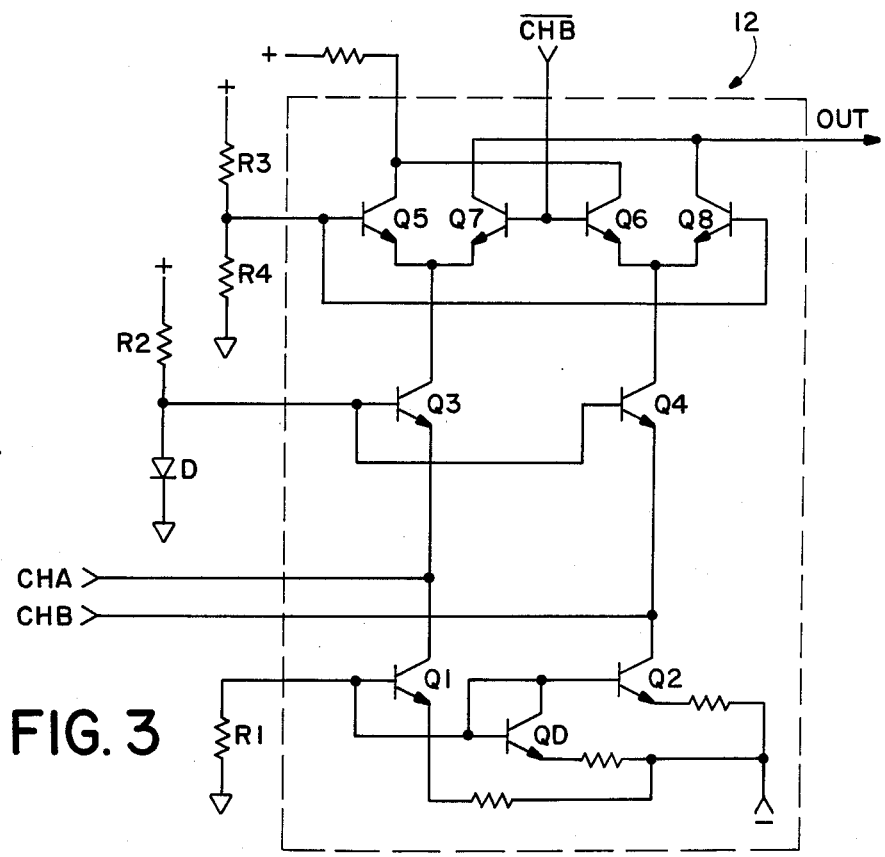
FIG. 3 is a schematic diagram of the multiplexer for the dual channel display of FIG. 1.

The multiplexer 12 is shown in greater detail in FIG. 3. A standard IC chip, such as the 1496 manufactured by Motorola Semiconductor Products Inc. of Phoenix, Ariz. which is usually used as a modulator, has constant current sources Q1 and Q2 connected to a source of negative voltage. The bases of Q1 and Q2 are biased by a diode-connected transistor QD, an internal resistor and an external resistor R1 between the negative voltage source and ground. The current sources Q1 and Q2 are connected to the emitters of respective buffer amplifiers Q3 and Q4 to which also are input the channel A and channel B composite video signals, respectively. Amplifiers Q3 and Q4 are biased by the same external resistor R2 and diode D combination between a positive voltage and ground. The outputs of the amplifiers Q3 and Q4 are applied to the emitters of differential transistor pairs Q5, Q7 and Q6, Q8 respectively. /CHB is applied to the bases of transistors Q6 and Q7, while the collectors of Q5 and Q6 are connected to a positive voltage and the collectors of Q7 and Q8 are connected to the output OUT. The bases of Q5 and Q8 are biased by external resistors R3 and R4 between the positive voltage and ground. When /CHB is high Q6 conducts and the emitter of Q8 goes high, cutting off Q8 so that the output OUT is from Q7, i.e., from channel A. When /CHB is low Q7 is cutoff and Q8 conducts so that the output OUT is channel B.

Figure 4:
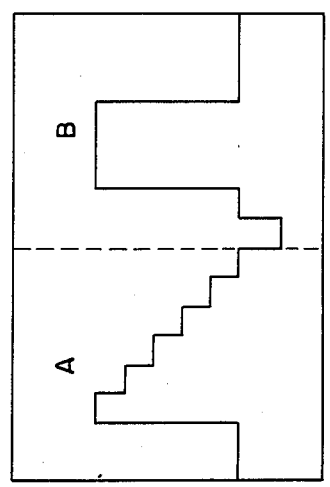
FIG. 4 is an illustrative view of the image on the dual channel display.
Figure 2:
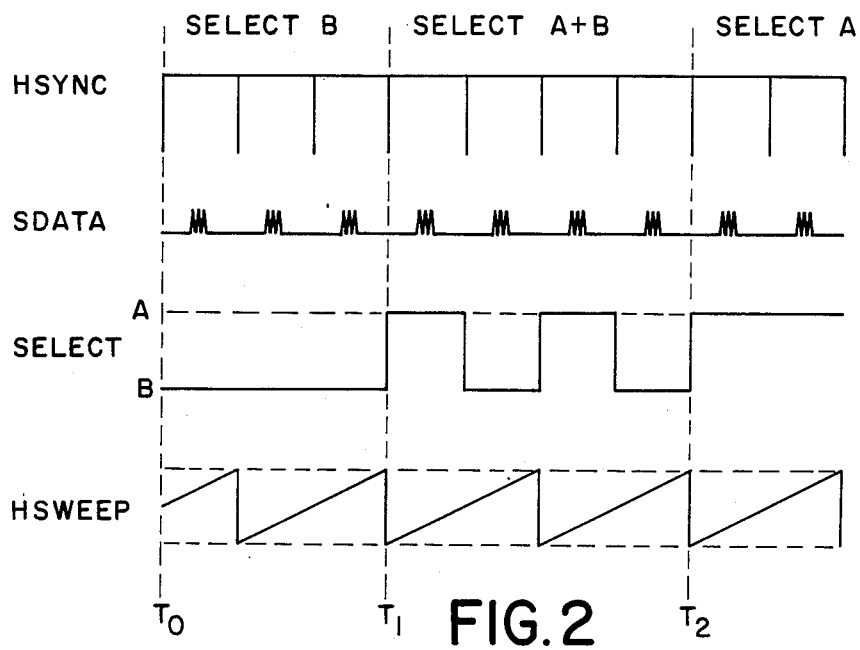
FIG. 2 is a timing diagram for the dual channel display of FIG. 1.

In operation the horizontal sweep HSWEEP, as shown in FIG. 2, covers two HSYNC pulses so that two video lines are displayed across the monitor. For each HSYNC pulse the latch 24 is loaded with new commands according to the display mode selected by the operator. If the operator selects channel B, i.e., CHB is low, then two consecutive lines of channel B are displayed side-by-side. If the operator selects channel A, i.e., /CHB is high, then two consecutive lines of channel A are displayed side-by-side. Finally, if the operator selects both, /CHB alternates between high and low once for each horizontal sweep HSWEEP so that during the first half of HSWEEP channel A is displayed and during the second half of HSWEEP channel B is displayed, i.e., channels A and B are displayed side-by-side simultaneously as shown in FIG. 4.

Thus, the present invention provides a dual display device for displaying two channels of data side-by-side horizontally by alternating between the channels at a rate that is twice the horizontal sweep rate of the display device.

What is claimed is:

1. A dual waveform display device comprising:
   means for switching between two channels of synchronized video information in the form of video waveforms having as inputs the two channels of synchronized video information and as an output one of the two channels of synchronized video information; and
   means for controlling the switching means so that the two channels are displayed horizontally side-by-side during a single horizontal sweep across the display device.

2. The dual display device as recited in claim 1 further comprising:
   sync selection means for switching between the output of the channel switching means and an external video signal under control of the controlling means; and
   means for extracting horizontal sync pulses from the output of the sync selection means for input to the controlling means for use by the controlling means in providing the timing for controlling the channel switching means.

3. The dual display device as recited in claim 2 wherein the controlling means comprises:
   a microprocessor having as inputs a selected display mode and the horizontal sync pulses from the extracting means, and outputting for each horizontal sync pulse a serial data word to be executed upon the receipt of the next horizontal sync pulse, the serial data word being a function of the selected display mode; and
   a latch into which the serial data word is loaded between horizontal sync pulses, and which transfers the serial data word to the latch output upon receipt of the next horizontal sync pulse.

4. The dual display device as recited in claim 3 wherein the channel switching means comprises a modulator circuit configured as a multiplexer so that the output of the multiplexer is determined by the serial data word at the output of the latch, the input being the two channels of video information.

* * * * *

REEXAMINATION CERTIFICATE (1015th)
United States Patent [19]

Nicholas

[11] B1 4,677,481

[45] Certificate Issued Feb. 21, 1989

[54] DUAL DISPLAY MONITOR

[75] Inventor: Dan H. Nicholas, Beaverton, Oreg.

[73] Assignee: Tektronix, Inc., Beaverton, Oreg.

Reexamination Request:
No. 90/001,367, Nov. 2, 1987

Reexamination Certificate for:
Patent No.: 4,677,481
Issued: Jun. 30, 1987
Appl. No.: 840,101
Filed: Mar. 17, 1986

[51] Int. Cl.⁴ .................. H04N 5/00; H04N 13/00
[52] U.S. Cl. ........................... 358/139; 324/88; 358/88; 358/92
[58] Field of Search .............. 358/139, 88, 92, 10, 358/3; 324/77 R, 88; 340/705, 720, 721, 722, 734; 315/392

[56] References Cited

U.S. PATENT DOCUMENTS

| | | | |
|---|---|---|---|
| 3,074,014 | 1/1963 | Ross | 324/88 |
| 3,525,087 | 8/1970 | Herriott | 358/88 |
| 3,818,474 | 6/1974 | Kurner | 340/734 |
| 3,872,461 | 3/1975 | Jarosik | 340/721 |
| 3,876,936 | 4/1975 | Lester | 324/88 |
| 3,938,003 | 2/1976 | Shimizu | 315/392 |
| 4,222,048 | 9/1980 | Johnson | 340/722 |
| 4,399,462 | 8/1983 | Balopole | 358/183 |
| 4,577,188 | 3/1986 | Inami | 340/721 |

FOREIGN PATENT DOCUMENTS

845440 2/1958 United Kingdom .

OTHER PUBLICATIONS

Leader Instruments Corporation, 1983/84 Catalog, Functional Index, LBO-552C Stereoscope.
Cezar International, Ltd., The Match Box, Preliminary Data Sheet.
The Originators, The Match Box, Cezar International, Ltd. Spec Sheet.

*Primary Examiner*—Howard W. Britton

[57] ABSTRACT

A waveform monitor for television has dual video channels displayed simultaneously side-by-side. The two channels are synchronized with each other or with an external sync signal and are input to a multiplexer prior to the display. A microprocessor controls the switching of the multiplexer according to the selection made by an operator. The first channel is displayed during the first half of the horizontal display sweep, and the second channel is displayed during the second half, the horizontal sweep encompassing two horizontal lines of video.

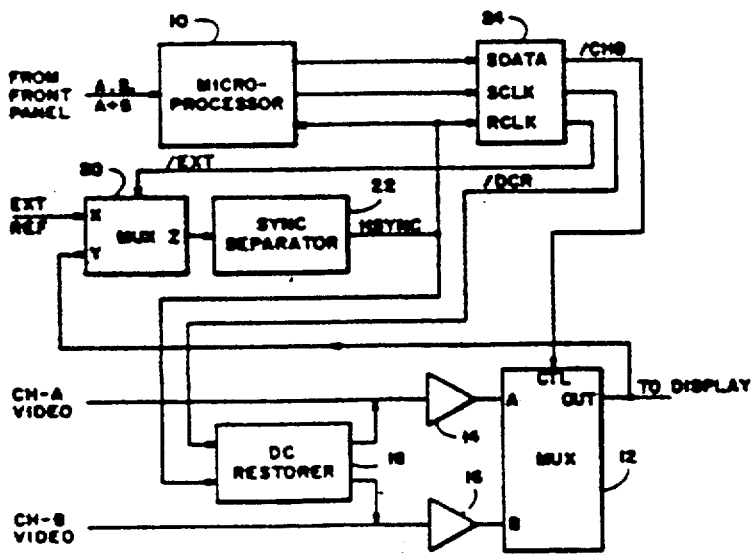

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-4, dependent on an amended claim, are determined to be patentable.

1. A dual waveform display device comprising:
 means for switching between two channels of [synchronized] video information in the form of video waveforms, *each channel being synchronized to a sync signal, the switching means* having as inputs the two channels of [synchronized] video information and as an output one of the two channels of [synchronized] video information; and
 means for controlling the switching means so that the two channels are [displayed] *automatically switched as a function of the sync signal for display* horizontally side-by-side during a single horizontal sweep across the display device, *the duration of the single horizontal sweep being an integer multiple of the duration of a single line interval of the video information where the integer multiple is a function of the number of channels being displayed.*

* * * * *